United States Patent [19]

Freitag et al.

[11] Patent Number: 4,645,806
[45] Date of Patent: Feb. 24, 1987

[54] USE OF CERTAIN POLYPHENYLENE OXIDES FOR THE PRODUCTION OF AROMATIC BLOCK POLYETHER-POLY(ESTER) CARBONATES BY THE INTERFACIAL PROCESS

[75] Inventors: Dieter Freitag; Ludwig Bottenbruch, both of Krefeld; Klaus G. Wilms, Dormagen; Peter Tacke, Krefeld, all of Fed. Rep. of Germany

[73] Assignee: Bayer Aktiengesellschaft, Bayerwerk, Fed. Rep. of Germany

[21] Appl. No.: 806,570

[22] Filed: Dec. 9, 1985

[30] Foreign Application Priority Data

Dec. 13, 1984 [DE] Fed. Rep. of Germany ....... 3445440
Jul. 16, 1985 [DE] Fed. Rep. of Germany ....... 3525337

[51] Int. Cl.$^4$ .................... C08G 63/64; C08F 283/02
[52] U.S. Cl. .................................... 525/462; 525/390; 525/394
[58] Field of Search .................. 525/462, 397, 390; 528/214

[56] References Cited

U.S. PATENT DOCUMENTS

| 3,028,365 | 4/1962 | Schnell et al. | 260/47 |
| 3,275,601 | 9/1966 | Schnell et al. | 260/47 |
| 4,234,706 | 11/1980 | White | 525/390 |
| 4,374,959 | 2/1983 | Loucks et al. | 525/394 |
| 4,436,876 | 3/1984 | Loucks | 525/462 X |
| 4,487,918 | 12/1984 | Heitz et al. | 528/212 |
| 4,521,584 | 6/1985 | Heitz et al. | 528/214 |
| 4,554,330 | 11/1985 | Mark et al. | 525/462 |
| 4,600,753 | 7/1986 | Freitag et al. | 525/462 X |

FOREIGN PATENT DOCUMENTS

| 1173998 | 9/1984 | Canada . |
| 2636784 | 2/1978 | Fed. Rep. of Germany . |
| 3340493 | 11/1983 | Fed. Rep. of Germany . |
| 1182720 | 3/1970 | United Kingdom . |

Primary Examiner—Lucille M. Phynes
Attorney, Agent, or Firm—Gene Harsh; Joseph C. Gil; Aron Preis

[57] ABSTRACT

This invention relates to the use of polyphenylene oxides corresponding to the following general formula:

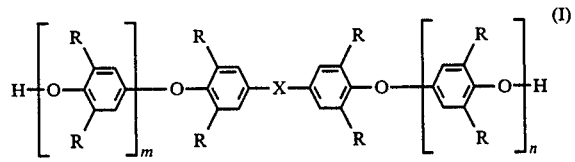

for the production of aromatic block polyether-poly(ester) carbonates by the interfacial process and also to the block polyether-poly(ester) carbonates obtainable by the process.

10 Claims, No Drawings

USE OF CERTAIN POLYPHENYLENE OXIDES FOR THE PRODUCTION OF AROMATIC BLOCK POLYETHER-POLY(ESTER) CARBONATES BY THE INTERFACIAL PROCESS

DE-OS 33 08 421 relates to bifunctional aromatic polyphenylene oxides corresponding to the following general formula:

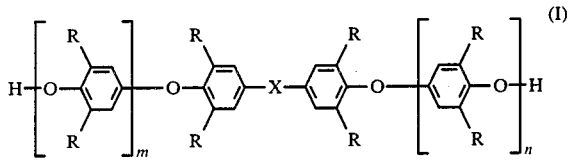

wherein
R, which may be the same or different, represents hydrogen or a $C_1$-$C_4$ alkyl radical;
X represents a group

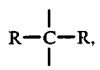

wherein R is as defined above, —O—, —S— or —$SO_2$—; and
m and n represent integers of from 1 to 200.

These polyphenylene oxides are produced by reacting a mixture of phenols corresponding to the following general formulae:

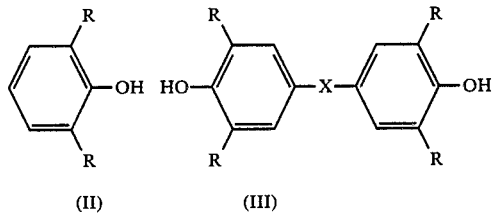

wherein R and X are as defined above;
with oxygen in an organic solvent in the presence of a catalyst at temperatures of from −80° to +100° C., opitonally under elevated pressure.

The organic solvents used may be aromatic solvents, such as benzene, toluene, ethyl benzene, nitrobenzene, halogenated solvents, such as carbon tetrachloride, dichloroethane, trichloroethylene, tetrachloroethylene, tetrachloroethane, trichloroethane, chlorobenzene, and pyridines.

Suitable catalysts are metal compounds, for example halides, sulphates and oxides, of elements of the 1st and 7th secondary groups of the Periodic Table according to Mendelejew, (Hofmann Rudorff, Anorganische Chemie, 19th Edition, 1963, page 97, Vieweg Verlag, Braunschweig) such as CuCl, CuBr, $Cu_2SO_4$, $CuCl_2$, $MnCl_2$, $Ag_2O$. Other suitable catalysts are organic bases, such as pyridine, methyl pyridine, N,N-dimethyl-4-aminopyridine, poly-4-vinylpyridine, piperidine, morpholine, triethanolamine, and open-chain aliphatic amines, such as n-butylamine, octylamine, dibutylamine, N,N-dimethyl-n-hexylamine, N,N-dimethyl-n-butylamine, triethylamine, (N,N'-di-t-butyl)-ethylene diamine, 2-aminoethane thiol, 2-mercapto-1-ethanol, 2-mercaptoacetic acid, 1,2-dimercapto-4-methyl-benzene, disodium-1,2-dicyanoethylene dithiolate, dimercaptomaleic acid monoamide, Schiff's bases and hydrazones, for example hydrazones of benzoin.

The polyphenylene oxides are preferably prepared at temperatures of from 40° C. and under pressures of from 0 to 15 bar, preferably from 0 to 5 bar.

From 2 to 400 moles, preferably from 3 to 20 moles, of phenol (II) are used per mole of phenol (III).

The process for preparing the polyphenylene oxides (I) may be carried out as follows:

The catalyst and the co-catalyst are initially introduced in the organic solvent and oxidized with oxygen. The monomer mixture of the phenols (II) and (III) dissolved in the organic solvent is then added and oxidized with oxygen, after which the bifunctional polyphenylene oxide is isolated, for example by precipitation with an alcohol (for example methanol). Analysis of the reaction product may be carried out by conventional methods (for example osmometric molecular weight determination, determination of the phenolic OH number, for example by titration).

Using the process according to DE-OS 33 08 421, it is possible to produce both symmetrical and also asymmetrical bifunctional polyphenylene ethers. Products that are symmetrical in this context are obtained by using phenols (II) and (III) carrying the same substituents.

Polymer blocks containing two functional terminal groups and having a high glass transition temperature may be obtained by the process according to DE-OS 33 08 421. These blocks may be reacted, for example with acid chlorides, such as phosgene, terephthaloyl chloride, with diisocyanates, with carbonates and other polymer blocks to form high molecular weight compounds. Materials produced from these high molecular weight compounds are distinguished by the high dimensional stability to heat thereof. (Particulars of the compounds (I), the production and use thereof may also be found, for example, in DE-OS 33 00 792 and in DE-OS 33 40 493).

Now, the present invention relates to the use of the polyphenylene oxides (I) for the production of aromatic block polyether-poly(ester) carbonates using the known interfacial method for producing poly(ester) carbonates.

The interfacial method for producing thermoplastic aromatic polycarbonates is known (c.f., for example, U.S. Pat. Nos. 3,028,365 and 3,275,601). The interfacial method for producing aromatic polyester carbonates is also known (c.f. for example DE-OS 30 07 934).

In addition, it is known from DE-OS 32 11 636 that polyphenylene ether blocks may be incorporated in polycarbonates by the interfacial method. However, the bifunctional polyether blocks used therein lead to block polyether polycarbonates lacking thermal stability so that they may only be processed into useful injection mouldings with considerable difficulty, if at all.

The production of segmented polyether polycarbonates by the interfacial method is known from DE-OS 26 36 784.

Surprisingly, the aromatic block polyether-poly(ester) carbonates obtained from the polyphenylene oxides (I) are thermally stable and are thus suitable for thermoplastic processing in various ways so that high-quality mouldings may readily be obtained therefrom.

The present invention also relates to a process for producing aromatic block polyether-poly(ester) carbonates by the interfacial method from:

(1) polyphenylene oxides containing hydroxyl groups;
(2) other diphenols;
(3) chain-terminators;
(4) phosgene; optionally
(5) up to 80 mole %, preferably up to 60 mole %, based on the total moles of carbonate and carboxylate groups, of arylene dicarboxylic acid chlorides; and, optionally
(6) from 0.01 to 1 mole %, based on moles of diphenols according to the sum of components (1) and (2)., of branching agents;

characterized in that polyphenylene oxides (I) are used as component (1) in quantities of from 5 to 95%, by weight, preferably from 10 to 95%, by weight, more preferably from 20 to 60%, by weight, based in each case on the total weight of the resulting block polyether-poly(ester) carbonates, components (1), (2), (3), and optionally (6) being assumed to react substantially quantitatively.

Preferred polyphenylene oxides (I) are those having number average molecular weights ($\overline{M}n$), as determined by the osmometric method using $CH_2Cl_2$ as solvent, of from 600 to 10,000, more especially those in which "m" and "n" represent integers of from 3 to 20 and, above all, those having $\overline{M}n$-values of from 900 to 3000. Particularly preferred polyphenylene oxides (I) are those wherein R represents $CH_3$.

Other diphenols corresponding to component (2) suitable for use in the production of the aromatic block polyether-poly(ester) carbonates preferably contain from 6 to 30 carbon atoms and preferably correspond to the following general formula:

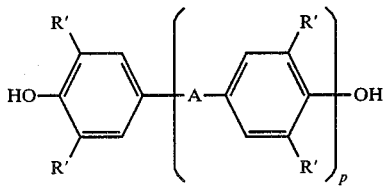

(IV)

wherein
A represents a single bond, $C_1$-$C_6$ alkylene, $C_2$-$C_6$ alkylidene, $C_5$ or $C_6$ cycloalkylidene,

—$SO_2$— or a radical of the formula:

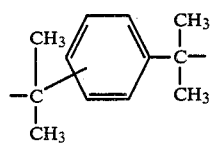

(a)

R', which may be the same or different, represents H, $CH_3$, Cl or Br; and
p represents 0 or 1.

Other such diphenols are known from the literature, as is the use thereof in the production of aromatic polycarbonates by the interfacial method (c.f. for example H. Schnell, Chemistry and Physics of Polycarbonates, Interscience Publishers, New York, 1964; U.S. Pat. No. 3,038,365, DE-OS 20 63 050 and DE-OS 22 11 957).

The use of the other diphenols (IV) for the production of aromatic polyester carbonates by the interfacial method is also known from the literature (c.f. for example DE-OS 30 07 934).

Preferred other diphenols are 4,4'-dihydroxydiphenyl, 2,2-bis-(4-hydroxyphenyl)-propane, 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl-butane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis(3,5-dibromo-4-hydroxyphenyl)-propane.

Particularly preferred other diphenols are, for example, 2,2-bis-(4-hydroxyphenyl)-propane, 2,2-bis-(3,5-dimethyl-4-hydroxyphenyl)-propane, 2,2-bis(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Chain-terminators suitable for use in accordance with the present invention are those of the known monophenol type, such as phenol, p-t-butyl-phenol, p-methyl-phenol, p-isooctyl-phenol, p-chlorophenol, p-bromophenol and 2,4,6-tribromophenol, the chlorocarbonic acid esters of these phenols and also mono-carboxylic acid chlorides, such as acetyl chloride, benzoyl chloride, stearyl chloride and the like. They are used in quantities of from 0.01 to 10 mole %, based on moles of diphenols.

Branching agents suitable for use in accordance with the present invention are those containing three or more than three functional groups; suitable functional groups are preferably aromatic carboxyl chloride or phenolic OH groups.

Examples of branching agents are trimesic acid trichloride, cyanuric acid trichloride, 3,3'-, 4,4'-benzophenone tetracarboxylic acid tetrachloride, 1,4,5,8-naphthalene tetracarboxylic acid tetrachloride, pyromellitic acid tetrachloride, 1,3,5-tri(4-hydroxyphenyl)-benzene, 1,1,1-tri-(4-hydroxyphenyl)-ethane, tri-(4-hydroxyphenyl)-phenyl-methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methyl-benzyl)-4-methyl-phenyl, 2-(4-hydroxyphenyl)-2-(2,4-dihydroxyphenyl)-propane, tetra-(4-[4-hydroxyphenylisopropyl]-phenoxy)-methane and 1,4-bis-[(4,4''-dihydroxydiphenyl)-methyl]-benzene.

The incorporation of branching agents in polycarbonates and even in segmented polyether polycarbonates by the interfacial method is known (c.f. DE-OS 15 70 533, U.S. Pat. No. Re 27,682, DE-OS 26 36 784 and DE-OS 27 26 376).

Arylene dicarboxylic acid dichlorides (component (5.)) are those containing from 8 to 20 carbon atoms, for example benzene dicarboxylic acid dichlorides, diphenyl dicarboxylic acid dichlorides, naphthalene dicarboxylic acid dichlorides, preferably terephthalic acid dichlorides and isophthalic dichlorides and also mixtures thereof in a ratio of from 99:1 to 1:99.

Instead of using the other diphenols for component (2), it is also possible to use bis-chlorocarbonic acid esters thereof and also bis-chlorocarbonic acid esters of oligocarbonates of the other diphenols of component (2), "oligo" in this context signifying a degree of polymerization of from 2 to 10.

As is known, the organic phase of the interfacial method consists, for example, of $CH_2Cl_2$, chlorobenzene or mixtures thereof.

The alkaline aqueous phase generally has a pH of from 8 to 14, preferably from 9 to 13.

The ratio, by volume, of organic to inorganic phase is generally from 1:6 to 1:1.

The organic phase is generally used in such a quantity that the resulting block polyether-poly(ester) carbonate accumulates as a from 0.5 to 20%, by weight, solution.

The phosgene may be used in a molar quantity of up to 150 mole %, based on the total moles of components (1) and (2). Where dicarboxylic acid dichlorides are simultaneously used, the quantity of phosgene used is reduced by the aliquot amount. The dicarboxylic acid dichlorides are used in substantially stoichiometric quantities, based on the total moles of components (1) and (2). The quantity in which the dicarboxylic acid dichlorides are used is calculated on the basis of the number of moles of carboxylate groups required in the polyether-polyester carbonate.

Suitable catalysts for the process according to the present invention are tertiary amines and/or quaternary ammonium salts and/or quaternary phosphonium salts used in quantities of from 0.01 to 5 mole %, based on the moles of diphenols of components (1) and (2).

Preferred ammonium salts (Va) and preferred phosphonium salts (Vb):

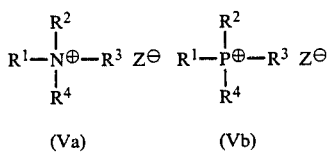

are those wherein $Z^{(-)}$ represents $Cl^{(-)}$ or $Br^{(-)}$ and $R^1$ to $R^4$, which may be the same or different, represent $C_1$–$C_{20}$ alkyl, $C_6$–$C_{10}$ cycloalkyl, $C_7$–$C_{30}$ aralkyl or $C_7$–$C_{30}$ alkenyl; two of the radicals $R^1$ to $R^4$ may also form a $C_4$–$C_{12}$ alkylene group.

Preferred tertiary amines are those corresponding to the following general formula:

wherein $R^5$, $R^6$ and $R^7$, which may be the same or different, represent $C_1$–$C_{20}$ alkyl or $C_6$–$C_{10}$ cycloalkyl; once again, two of the radicals $R^5$ to $R^7$ may form a $C_4$–$C_{12}$ alkylene group.

Preferred catalysts are triethylamine, tetrabutylammonium bromide and N-ethyl-piperidine.

The catalysts may be added before or after the phosgene or the arylene dicarboxylic acid dichloride. They are preferably added after the phosgene and the arylene dicarboxylic acid dichloride.

The aromatic block polyether-poly(ester) carbonates produced in accordance with the present invention are isolated in the conventional way by concentrating the isolated and purified organic phase form the interfacial method by evaporation, optionally in a vacuum extruder.

The aromatic block polyether-poly(ester) carbonates obtainable in accordance with the present invention are new and generally have relative solution viscosities of from 0.8 to 2, preferably from 1.2 to 1.5, as measured on a solution of 0.5 g of substance in 100 ml of $CH_2Cl_2$ solution at 25° C.

Accordingly, the present invention also relates to the aromatic block polyether-poly(ester) carbonates obtainable by the present process.

The block polyether-poly(ester) carbonates obtainable in accordance with the present invention may contain the UV, $H_2O$ and heat stabilizers, mould release agents, flame-proofing agents, pigments and fillers (such as glass fibres, glass beads, carbon fibres, carbon black, kieselguhr and kaolin) normally used for polycarbonates, polyester carbonates or polyphenylene oxides.

The aromatic block polyether-poly(ester) carbonates obtainable in accordance with the present invention may be processed into high-quality mouldings by injection moulding in conventional machines at temperatures of from 250° to 380° C.

The aromatic block polyether-poly(ester) carbonates obtainable in accordance with the present invention may also be extruded into semi-finished products by extrusion in conventional extruders at temperatures of from 250° to 380° C.

The aromatic block polyether-poly(ester) carbonates obtainable in accordance with the present invention may also be cast to form films by coating concentrated solutions in $CH_2Cl_2$ onto smooth substrates and evaporating the solvent.

The mouldings and the semi-finished products of the aromatic block polyether-poly(ester) carbonates obtainable in accordance with the present invention may be used for various applications where thermoplasts of high dimensional stability to heat are used, i.e. for example in electrical engineering.

EXAMPLES

I. Preparation of intermediates

I.(1) Preparation of a quinone-coupled bifunctional polyphenylene oxide in accordance with Example V of U.S. Pat. No. 4,234,706.

240 g of 3,3',5,5'-tetramethyl-1,4-diphenol quinone (TMDQ) and 970 g of oligo-(2,6-dimethyl-1,4-phenylene oxide) having an $\overline{M}n$ value (as determined in known manner by oxmometry) of approx. 485 were dissolved under nitrogen in 7 liters of toluene at 80° C. and stirred for 1 hour, after which the reaction mixture was cooled to approx. 20° C. and the product precipitated with 30 l of methanol. The precipitated material was filtered off under suction, washed with methanol and dried at 80° C. in a vacuum drying cabinet.

The bifunctional polyphenylene oxide obtained had an $\overline{M}n$-value of approx 1210 (determined as described above).

I.(2) Preparation of a bifunctional polyphenylene oxide in accordance with Example 1 of DE-OS 33 08 421.

In a cylindrical glass vessel having an internal diameter of 18 cm, 15 g of CuCl and 35 g of N,N-dimethyl-4-aminopyridine were dissolved or suspended in 1.2 l of chlorobenzene, after which air was passed through (100 l/h) for 1 hour. A solution of 285 g of 2,2-bis-(3,5-dimethyl-4-hydroxyphenyl)-propane and 977 g of 2,6- dimethyl-phenol in 8 l of chlorobenzene was then added and air passed through (100 l/h). The temperature rose from an initial value of 20° C. to 28° C.

The reaction was terminated when the content of OH groups in the dissolved organic solid amounted to 2.75%, by weight, (as determined by IR-spectroscopy using a calibration curve). The solution was freed from the copper with aqueous EDTA-trisodium salt solution and then washed with dilute HCl and aqueous NaHCO$_3$ solution and water.

The bifunctional oligophenylene oxide remaining after concentration of the solution by evaporation had an $\overline{M}n$ value (as determined by osmometry in CH$_2$Cl$_2$) of approx. 1250.

According to analysis by gel chromatography, the product contained only about 2%, by weight, of monofunctional components.

II. Preparation of block polyether-polycarbonates.

II.(1) Comparison products using (I.1)

1700 g (7.45 moles) of bisphenol A and 33.57 g (3 mole %) of t-butyl phenol were dissolved with 16 moles of NaOH in 55 liters of water. After addition of a solution of 1700 g of the bifunctional polyphenylene oxide of Example I.1) and 40 liters of dichloromethane, 2 kg of phosgene were introduced over a period of 2 hours with vigorous stirring at from 22° to 24° C. and the pH of the aqueous phase maintained at from 13 to 14 by addition of more NaOH.

After addition of 20 ml of N-ethyl-piperidine, the after-reaction took 1 hour at 22°-24° C./pH 13-14, still with vigorous stirring.

For working-up, the phases were separated, the organic phase was acidified, washed until free from electrolyte, diluted with 12 liters of chlorobenzene and the dichloromethane distilled off. The chlorobenzene was evaporated in vacuo at 380° C. in a twin screw extruder.

The granulate obtained was dark brown in colour and blistery and had a relative solution viscosity of 1.236.

II.(2) Preparation of block polyether-polycarbonate using I.(2).

The procedure was as in Example II.(1), except that instead of I.(1) the polyphenylene oxide I.(2) was used in the same quantity. The granulate obtained was only pale yellow in colour and was not blistery. It had a relative solution viscosity of 1.285.

III. Preparation of block polyether-polyester carbonates

III.(1) Comparison product using I.(1).

1700 g (7.45 moles) of bisphenol A and 33.57 g (3 mole %) of t-butyl-phenol were dissolved with 16 moles of NaOH in 55 liters of water.

After addition of a solution of 1700 g of the bifunctional polyphenylene oxide I.(1) in 37 liters of dichloromethane, 812 g (4 moles) of an equimolar mixture of iso- and tere-phthalic acid dichloride in 3 liters of CH$_2$Cl$_2$ was added dropwise over a period of 1 hour with vigorous stirring at from 22° to 24° C.; 300 g (3 moles) of phosgene were introduced at the same time. The pH of the aqueous phase was maintained at from 13 to 14 by addition of more NaOH.

Thereafter, another 300 g of phosgene were introduced over a period of 30 minutes and, after addition of 20 ml of N-ethyl-piperidine, the reaction mixture was stirred at pH 13-14 for the after-reaction.

The reaction mixture was worked-up in the same way as in Example II.(1). The granulate obtained was dark brown and blistery and had a relative solution viscosity of 1.267.

III.(2) Preparation of a block polyether-polyester carbonate using I.(2).

The procedure was as in Example III.(1), except that instead of I.(1) the polyphenylene oxide I.(2) was used in the same quantity.

The granulate obtained was only pale yellow in colour and not blistery. It had a relative solution viscosity of 1.279.

| | Properties of injection-moulded test specimens of the products of Examples (II.1), (II.2), (III.1), (III.2) | | | | |
|---|---|---|---|---|---|
| Properties | Unit of measure | (II.1) | (II.2) | (III.1) | (III.2) |
| η$_{rel}$ | | | | | |
| granulate | | 1.236 | 1.285 | 1.367 | 1.279 |
| test specimen | | 1.229 | 1.282 | 1.243 | 1.276 |
| Yield stress | MPa | 68.7 | 70.5 | 65.3 | 67.5 |
| Tensile strength | MPa | 53.8 | 58.7 | 51.7 | 52.8 |
| Breaking elongation DIN 53 455 | % | 24.3 | 23.1 | 19.6 | 21.4 |
| Impact strength DIN 53 453 | kJ/M$^2$ | unbroken | unbroken | unbroken | unbroken |
| Notched impact strength DIN 53 454 | kJ/m$^2$ | 4.3 | 11.8 | 5.7 | 13.1 |
| Vicat VST/B/120 DIN 53 460 | °C. | 175 | 178 | 181 | 186 |
| Appearance: | | dark brown, blistery | Pale yellow | dark brown, blistery | pale yellow |

We claim:

1. A process for the production of an aromatic block polyether-poly(ester) carbonate which comprises interfacial process for producing poly(ester) carbonates using a polyphenylene oxide corresponding to the following general formula:

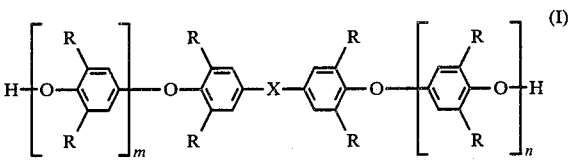

wherein
R independently represents hydrogen or C$_1$-C$_4$ alkyl;
X represents

wherein R is as defined above, —O—, —S— or —SO$_2$—; and m and n independently represent integers of from 1 to 200.

2. A process as claimed in claim 1 wherein there are used
   (1) one or more hydroxyl group-containing polyphenylene oxides;
   (2) one or more other diphenols;
   (3) one or more chain-terminators;
   (4) phosgene; optionally
   (5) up to 80 mole %, based on the total moles of carbonate and carboxylate groups, of one or more arylene dicarboxylic acid dichlorides; and, optionally,
   (6) from 0.01 to 1 mole %, based on moles of diphenols (1) and (2), of one or more branching agents;
one or more polyphenylene oxides as defined in claim 1 being used as component (1) in quantities of from 5 to 95%, by weight, based on the total weight of the resulting block polyether-poly(ester) carbonate.

3. A process as claimed in claim 2, wherein from 10 to 95%, by weight, of polyphenylene oxide (I) is used.

4. A process as claimed in claim 3 wherein from 20 to 60%, by weight, of polyphenylene oxide (I) is used.

5. A process as claimed in claim 2, wherein polyphenylene oxide (I) having a number average molecular weight ($\overline{M}n$) of from 600 to 10,000 is used.

6. A process as claimed in claim 5 wherein polyphenylene oxide (I) having $\overline{M}n$ as value of from 900 to 3000 is used.

7. A process as claimed in claim 5 wherein polyphenylene oxide (I), wherein m and n independently represent integers of from 3 to 20, is used.

8. A process as claimed in claim 2, wherein polyphenylene oxide (I), wherein R represents CH$_3$, is used.

9. A process as claimed in claim 2, wherein the catalyst required for the interfacial method is added after the phosgene and the arylene dicarboxylic acid dichloride.

10. Aromatic block polyether-poly(ester) carbonates obtainable by a process as claimed in claim 1.

* * * * *